Figure 1:
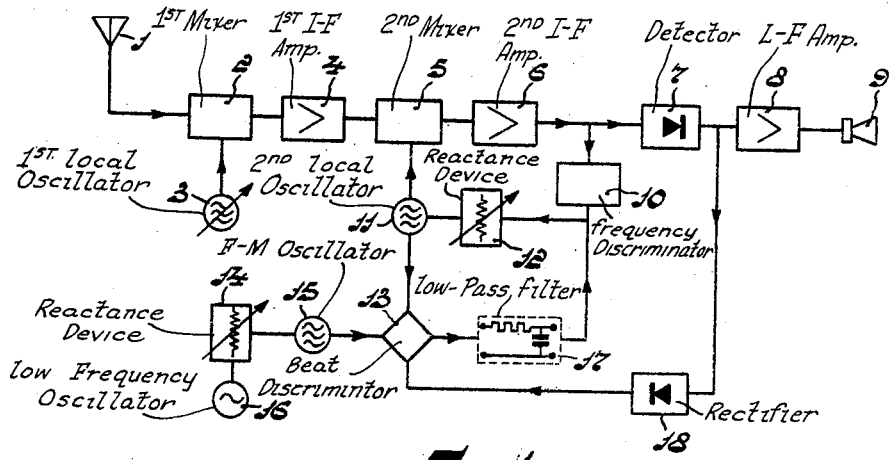

March 18, 1952   E. H. HUGENHOLTZ   2,589,387

DEVICE FOR AUTOMATIC FREQUENCY-CORRECTION

Filed Dec. 2, 1947

INVENTOR
E. H. HUGENHOLTZ

BY Fred M. Vogel
AGENT

Patented Mar. 18, 1952

2,589,387

UNITED STATES PATENT OFFICE 2,589,387

DEVICE FOR AUTOMATIC FREQUENCY-CORRECTION

Eduard Herman Hugenholtz, Eindhoven, Netherlands, assignor to Hartford National Bank and Trust Company, Hartford, Conn., as trustee Application December 2, 1947, Serial No. 789,202
In the Netherlands December 5, 1946

9 Claims. (Cl. 250—20)

For automatic frequency-correction devices are known, in which a control-voltage which governs a control impedance effecting the frequency-correction, is derived, by means of a frequency- and/or phase discriminator, from the frequency-difference and/or phase-difference of the master wave and the oscillation to be corrected in frequency.

Such devices are used for instance for automatically keeping constant in frequency and/or phase the voltage of a transmitter-oscillator, in which case the tuning frequency of the frequency determining oscillator-circuit usually corresponds to the master-frequency or a harmonic thereof, or for correcting automatically the frequency of a local oscillator of a superhet receiver (for instance a one-side band receiver) in a manner such as to maintain a constant frequency-difference corresponding to the intermediate frequency of the receiver.

The control impedances may be of very different types. For instance, the direction of rotation of a motor which controls the value of an impedance connected in parallel with the frequency-determining circuit, may be influenced in accordance with the polarity of the control voltage. Control impedances of this kind are possessed of considerable mechanical inertia, but they do not exhibit any so-called setting back force, so that the last-adjusted value of the corrected frequency is retained if the master wave disappears temporarily, for instance due to line disturbances or fading phenomena. Merely due to the master wave becoming inoperative approximately at the moment of reaching the exact value of the corrected frequency, the motor, due to mechanical inertia and the absence of braking forces, may cause this correct value to be passed.

With so-called inertia-free control-impedances (for instance an electron-discharge tube connected as a variable reactance, voltage- and/or current-dependent condensers and iron-cored coils) failure of the master wave and consequent disappearance of the control voltage bring about that the frequency to be corrected falls off to an average value.

The invention has for its object to provide a solution, which is particularly advantageous for devices of the last-mentioned kind, to prevent for an indefinite time, upon failure of the master wave, an undesirable set-back of the last-adjusted value of the frequency to be corrected, without adversely affecting the rate of control in the presence of the master wave.

To this end, according to the invention, the function of the master wave, upon becoming inoperative, is taken over by an auxiliary master wave, more particularly a frequency-spectrum.

If in this case the master wave fails, for instance due to fading, the frequency to be corrected, provided that changing over from the master wave to the auxiliary master wave takes place sufficiently rapidly, is corrected and maintained with respect to the nearest component of the preferably locally generated frequency-spectrum until the master wave appears again and is consequently capable of fulfilling its function which has temporarily been taken over by the frequency-spectrum.

If the frequency interval of the components in the spectrum is, for instance, 4 c./sec., which, as is well known, is inter alia the case in frequency-modulation of a carrier-wave having a frequency of 4 c./sec., a frequency set-back exceeding 4 c./sec. of the frequency to be corrected can be prevented in the case of unilateral control by the control-cascade to which the spectrum is supplied. In the case of bilateral control the set-back is limited to a maximum of 2 c./sec.

The spectrum instead of the master wave can be made operative by means of a relay which is energised when the master wave falls in amplitude below a predetermined minimum value and is preferably substantially inertia-free, so that it is constructed as an electronic relay.

In order that the invention may be more clearly understood and readily carried into effect, it will now be described more fully with reference to the accompanying drawing, given by way of example, in which Figs. 1 and 2 of the drawings represent diagrammatically two constructions of mono-side band receivers involving automatic frequency-correction according to the invention.

For the sake of simplicity the circuit elements of different construction as are known per se or previously suggested, are represented in block-form. In the drawing corresponding elements bear the same reference numerals.

In Figure 1 the reference numeral 1 represents the antenna of a mono-side band receiver, wherein the incoming signals are transposed in the first mixing stage, by means of a locally produced signal 3 of variable frequency, to a first intermediate frequency to which the intermediate-frequency amplifier 4 is tuned. The signal taken therefrom is supplied to a second mixing stage 5 for transposition to a second intermediate frequency to which is tuned the intermediate-frequency amplifier suppressing one of the side bands. The oscillations taken from the intermediate-frequency amplifier 6 are supplied to a loudspeaker 9 through a detector 7 and a low-frequency amplifier 8.

At the same time the signal taken from the intermediate-frequency amplifier 6 is supplied to a tuned discriminator 10 which, according as to whether the frequency of the signal appearing in a second intermediate-frequency circuit is higher or lower than the described value, supplies a positive or negative control-voltage which, for correcting the tuning frequency of the oscillator 11 supplying the second local oscillator signal, is fed to a reactance tube by which the oscillator is influenced and which is represented diagrammatically as a variable inductance.

The aforesaid circuit-arrangement involving double transposition of the incoming signal is known per se and has the advantage that automatic frequency-correction exhibits a control range which is independent of the random tuning of the receiver.

To prevent setting back of the frequency of the oscillator 11 to an average value in the case of disappearance, for instance due to fading, of the control voltage taken from the discriminator 10, the construction shown in Figure 1 comprises, according to the invention, an additional control cascade. This control cascade is adapted for synchronising two frequencies and comprises a so-called beat-discriminator 13 which may, for instance, be designed as a hexode mixer tube and has been explicitly described in the copending U. S. patent application Serial Number 711,692, filed November 22, 1946. This discriminator, to which the frequencies to be synchronised are fed, supplies a control voltage, the polarity of which depends upon the polarity of the frequency- and/or phase-difference to be corrected and which governs the reactance tube 12. The comparison voltage supplied, in addition to the oscillator voltage 11, to the discriminator 13, consists of a frequency spectrum which is obtained by frequency modulation of a carrier-wave signal produced by means of an oscillator 15. The modulating voltage supplied to the frequency modulator 14 is taken from a low-frequency generator 16 supplying, for instance, a sinusoidal voltage having a frequency of 4 c./sec. By a suitable choice of the value of the frequency swing effected by the frequency modulator 14 a frequency spectrum is obtained which extends throughout the control range of the reactance tube 12 practically entering into account and exhibits in this range components at relative intervals of 4 c./sec. and the amplitudes of which differ not too widely.

In this case the discriminator 13, by means of a reactance tube 12, brings about synchronisation between the oscillator frequency 11 and the nearest spectrum component, provided that the two spectrum components flanking the oscillator frequency have substantially the same amplitude.

To prevent with certainty synchronisation between the oscillator frequency 11 and a spectrum component other than one of the two flanking spectrum components, the time constant of the control cascade 13 is chosen to exceed one cycle of the frequency corresponding to the frequency interval of the spectrum component. This can be achieved in a simple manner by using a low-pass filter 17 in the output circuit of the discriminator 13. In conjunction therewith this filter is proportioned in such manner as to pass beat-frequencies to a maximum of 4 c./sec. For further details which are deemed superfluous for understanding the present invention, reference is made to the aforesaid copending U. S. patent application Serial Number 711,692, filed November 22, 1946.

From the low-frequency signal appearing in the receiving cascade after the detector 7 a direct voltage increasing with the amplitude of the incoming signals is derived by rectification (18) in the manner as usual for A. V. C. purposes, which direct voltage normally cuts off the mixer tube 13, for instance by grid control. In this way the control-cascade 13 to 17 is inoperative at a sufficient amplitude of the incoming signal, so that the receiving cascade comprising the A. F. C. circuit 10, 12 functions in a normal manner.

As soon, however, as the amplitude of the incoming signals falls below a given value, the discriminator 13 is no longer cut off and the frequency-spectrum obtained by means of the frequency-modulator 14 will take over the function of the intermediate-frequency signal 6 previously serving as a master signal for A. F. C. control. If the control-cascade 13 to 17 operates sufficiently fast it brings about synchronisation to one of the spectrum components flanking the last-adjusted value of the oscillator frequency 11. In the case of bilateral control by the control-cascade synchronisation to the nearest spectrum component takes place irrespective of whether its frequency is higher or lower than the oscillator-frequency 11. Upon failure of the A. F. C. circuit responding to the incoming signals the oscillator frequency 11 is consequently adapted to vary at the most by an amount of 2 c./sec. relatively to the last present oscillator-frequency.

As soon as the amplitude of the incoming signal and consequently the cut-off voltage taken from the detector 18 exceeds a predetermined threshold value the auxiliary A. F. C. circuit is blocked and the normal A. F. C. circuit again becomes operative.

In the construction shown in Figure 1 the control-cascades only have the reactance tube 12 in common. It is obvious that the two control-cascades may, for instance, have a common mixing stage. A particularly simple construction of the device according to the invention is obtained, for instance by direct superposition of the master wave and the auxiliary master wave. In this case, however, the spectrum causes inter alia modulation of the A. F. C. control voltage due to beat-phenomena between the two master waves, which brings about phase-modulation of the frequency to be corrected. For definite practical purposes, however, this is permissible.

Figure 2:
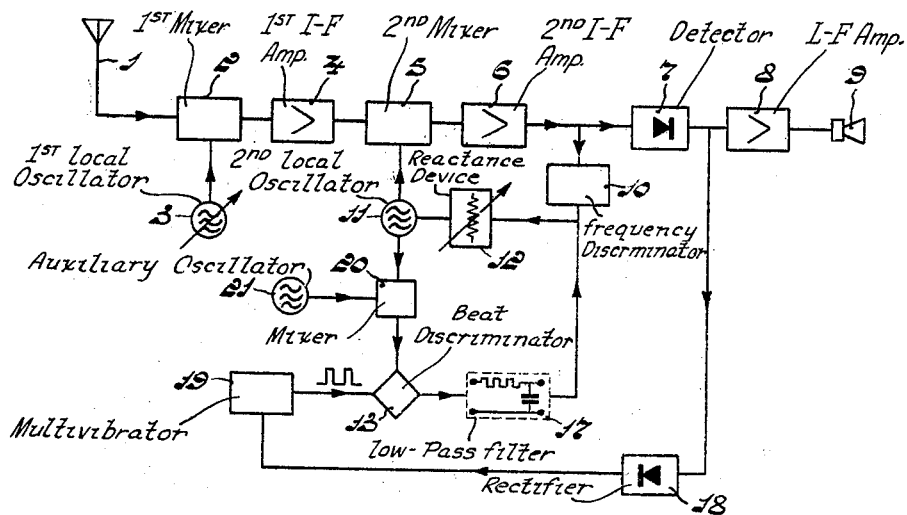

In the embodiment of the invention shown in Figure 2 the receiving cascade and the normal A. F. C. circuit, as well as the discriminator 13 and the low-pass filter 17 of the auxiliary A. F. C. circuit entirely correspond to that shown in Figure 1.

In Figure 2, however, an impulse-oscillator 19 is used for producing the synchronisation spectrum. This impulse oscillator may, for instance, comprise a multivibrator circuit-arrangement as known per se. The voltage taken from the oscillator 11 and to be supplied to the discriminator 13 is transposed down in frequency, by means of a mixing stage 20 and a local oscillator 21, to such a value that the frequency between this frequency, which varies on influencing the reactance tube 12, and the spectrum of the pulse synchronisation-voltage are in agreement with respect to frequency.

For correct operation of auxiliary A. F. C. circuit it is necessary for the duration of the pulses taken from the multivibrator 19 to be smaller than one cycle of the oscillator-frequency 11. For further explication of the operation (which is not required in the present case) reference is made to the copending U. S. patent application Serial Number 711,506, filed November 22 1946, Patent No. 2,574,482 granted November 13, 1951.

In the embodiment represented in Figure 2 the cut-off voltage for the auxiliary A. F. C. circuit is, in contra-distinction to Fig. 1, supplied to the multivibrator 19 which is consequently cut off with an adequate amplitude of the incoming signals.

Under certain circumstances it will not be possible, by a single multivibrator, to produce a spectrum which extends to approximately 10 kc./sec. at a very low fundamental frequency e. g. 4 c./sec. This disadvantage can be mitigated by making use of an artifice, for instance by using two multivibrators, one of which supplies a pulse voltage having a fundamental frequency of 4 c./sec., whereas the other multivibrator is synchronised to the 40th harmonic of the fundamental frequency of the first multivibrator and supplies a pulse voltage having a fundamental frequency of 160 c./sec. If the 60th harmonic of the fundamental frequency of the second multivibrator still has a sufficient amplitude, a frequency spectrum with components located at relative intervals of 4 c./sec., which extends from the fundamental frequency up to 9.6 kc./sec., can be obtained by mixing the output signals of the two multivibrators.

With reference to Figure 2 it is still pointed out that in this case a sinusoidal auxiliary master wave may be used, if the generator 21 be replaced by an impulse generator, whereby the operation of the arrangement is not affected.

Alternatively use may be made of a sinusoidal auxiliary master wave if the modulator 20 brings about frequency-modulation of the signal to be corrected in frequency, for instance by frequency modulation by means of a low-frequency oscillation of, say, 4 c./sec. In the case of frequency modulation by means of an oscillation of, say, 120 c./sec. the frequency of the signal to be corrected can be maintained at frequency intervals of 4 c./sec. by frequency-modulation of the sinusoidal auxiliary master wave by means of an oscillation of, say, 124 c./sec.

What I claim is:

1. Apparatus for automatic-frequency-correction with respect to a master wave comprising a controllable frequency oscillator, a normally-operative first control system for said oscillator including a voltage-responsive frequency control device coupled to said oscillator for varying the frequency thereof within a predetermined range, frequency discriminator means to produce a control voltage in accordance with the frequency difference between said master wave and said oscillator and means to apply said control voltage to said device to effect a predetermined relationship between the frequency of said master wave and said oscillator, a normally-disabled second control system including a voltage-responsive frequency control device coupled to said oscillator for varying the frequency thereof within said range, a generating circuit producing a spectrum of harmonically related frequency components throughout said range, beat discriminator means to compare the frequency of said oscillator with the frequency of the nearest component of said spectrum to produce a control wave and means to apply said control wave to said device to effect synchronism between the frequency of said oscillator and said nearest component, and means responsive to said master wave to render said second system operative upon the failure of said master wave, said voltage-responsive frequency control devices in said first and second control systems being one and the same device.

2. Apparatus for automatic-frequency-correction with respect to a master wave comprising an oscillator, a voltage-responsive control impedance coupled to said oscillator to vary the frequency thereof within a predetermined range, frequency discriminator means to produce a control voltage in accordance with the frequency difference between said master wave and said oscillator, means to apply said control voltage to said impedance to establish a predetermined relation between the frequency of said oscillator and said master wave, a generating circuit producing a spectrum of harmonically related frequency components within said range, beat discriminator means coupled to said oscillator and said circuit to produce a control wave in accordance with the frequency difference between the frequency of said oscillator and the frequency of the nearest component of said spectrum, and means responsive to cessation of said master wave to apply said control wave to said impedance to establish synchronism between the frequency of said oscillator and said one component.

3. An arrangement as set forth in claim 2 wherein said generating circuit to produce a frequency spectrum comprises an auxiliary oscillator and means to frequency modulate said oscillator at a predetermined rate.

4. An arrangement as set forth in claim 2 wherein said generating circuit to produce a frequency spectrum comprises a multivibrator developing a periodic square wave, whereby a spectrum of frequency components may be derived from said square wave, which components are successive harmonics of the fundamental frequency of the square wave.

5. An arrangement as set forth in claim 2 wherein said beat discriminator means comprising a mixer circuit, means to apply said spectrum of harmonically related frequency components and the oscillations from said oscillator as an input to said mixer circuit, and a low-pass filter coupling the output of said mixer circuit to said impedance, said filter having a band-pass characteristic yielding in the output thereof only the beat wave of said oscillations and the most proximate component of said spectrum.

6. An arrangement as set forth in claim 2 wherein said means responsive to cessation of said master wave to apply said control wave to said control impedance comprises rectifier means to derive from said master wave a control potential whose magnitude corresponds to the amplitude of said master wave and means to apply said control potential to said beat discriminator means to render same operative upon cessation of said master wave.

7. A superheterodyne receiver comprising an input channel for receiving a signal wave, a first mixer stage coupled to said channel to receive said signal wave therefrom, a local wave source coupled to said first mixer stage for producing a first intermediate-frequency wave, a second mixer stage coupled to said first mixer stage, a controllable frequency oscillator coupled to said second mixer stage for producing an intermediate-frequency master wave having a predetermined value, a frequency-responsive discriminator coupled to said second mixer stage for producing a control voltage proportional to the deviation of said master wave from said predetermined value, means responsive to said control voltage for varying the frequency of said oscillator within a predetermined range in a sense returning said master wave to said predetermined value, a generating circuit producing a spectrum of harmonically related frequency components throughout said range, a beat frequency discriminator coupled to said generating circuit and said oscillator to produce a control wave in accordance with the frequency difference between the frequency of said oscillator and the frequency of the most proximate component of said spectrum, and means responsive to cessation of said master wave to apply said control wave to said oscillator to cause the frequency of said oscillator to correspond to said most proximate component.

8. Apparatus for automatic-frequency correction with respect to a master wave comprising an oscillator, a voltage-responsive control impedance coupled to said oscillator to vary the frequency thereof within a predetermined range, frequency discriminator means to produce a control voltage in accordance with the frequency difference between said master wave and said oscillator, means to apply said control voltage to said impedance to establish a predetermined relation between the frequency of said oscillator and said master wave, means including a multivibrator to produce a spectrum of harmonically-related frequency components within said range, beat discriminator means coupled to said oscillator and said multivibrator to produce a control wave in accordance with the frequency difference between the frequency of said oscillator and the frequency of the most proximate component in said spectrum, rectifier means to derive from said master wave a control potential whose magnitude depends on the amplitude of said master wave, and means to apply said control potential to said multivibrator to render same operative solely upon cessation of said master wave.

9. Apparatus for automatic-frequency-correction with respect to a master wave comprising a controllable frequency oscillator, a wave generating circuit producing a spectrum of harmonically related frequency components, means coupled to said oscillator to control automatically the frequency thereof in accordance with the frequency difference between said master wave and said oscillator, and means responsive to cessation of said master wave and coupled to said oscillator and said spectrum generating circuit to control automatically the frequency of said oscillator in accordance with the frequency difference between said oscillator at the instant of said cessation and the nearest component of said spectrum.

EDUARD HERMAN HUGENHOLTZ.

REFERENCES CITED

The following references are of record in the file of this patent:

UNITED STATES PATENTS

| Number | Name | Date |
|---|---|---|
| 2,240,428 | Travis | Apr. 28, 1941 |
| 2,282,834 | Thomas | May 12, 1942 |
| 2,433,350 | Earp | Dec. 30, 1947 |